United States Patent
Wu et al.

[11] Patent Number: 6,162,352
[45] Date of Patent: Dec. 19, 2000

[54] GASOLINE UPGRADE

[75] Inventors: An-hsiang Wu, Bartlesville; Charles A. Drake, Nowata; Ralph J. Melton, Bartlesville, all of Okla.

[73] Assignee: Phillips Petroleum Company, Bartlesville, Okla.

[21] Appl. No.: 09/467,860

[22] Filed: Dec. 20, 1999

[51] Int. Cl.⁷ .................................................. C10G 45/04
[52] U.S. Cl. ........................ 208/216 R; 208/217; 502/63; 502/64; 502/66; 502/71; 502/74; 502/77
[58] Field of Search .................................. 502/63, 64, 66, 502/71, 74, 77; 208/216 R, 217

[56] References Cited

U.S. PATENT DOCUMENTS

| | | | |
|---|---|---|---|
| 4,437,976 | 3/1984 | Oleck et al. | 208/97 |
| 4,490,242 | 12/1984 | Oleck et al. | 208/97 |
| 5,401,391 | 3/1995 | Collins et al. | 208/208 |
| 5,789,331 | 8/1998 | Tsunoda et al. | 502/71 |
| 6,017,844 | 1/2000 | Wu et al. | 502/214 |
| 6,063,974 | 5/2000 | Drake et al. | 585/418 |
| 6,077,984 | 6/2000 | Drake et al. | 585/418 |
| 6,083,379 | 7/2000 | Drake et al. | 208/218 |

OTHER PUBLICATIONS

U.S. application No. 09/114,991, filed Jul. 14, 1998.
U.S. application No. 08/956,082, filed Oct. 23, 1997.
U.S. application No. 09/144,940, filed Sep. 1, 1998.
U.S. application No. 08/854,646, filed May 12, 1997.
U.S. application No. 09/060,579, filed Apr. 15, 1998.
U.S. application No. 09/126,343, filed Jul. 30, 1998.
U.S. application No. 09/469,202, filed Dec. 21, 1999.

*Primary Examiner*—Tom Dunn
*Attorney, Agent, or Firm*—Jeffrey R. Anderson

[57] ABSTRACT

A catalyst composition containing a sulfided mixture of a zinc spinel, a zeolite, alumina, cobalt and molybdenum, and a method of preparing such catalyst composition, are disclosed. The thus-obtained catalyst composition is employed as a catalyst in the hydrodesulfurization of a hydrocarbon feedstock containing gasoline.

33 Claims, No Drawings

GASOLINE UPGRADE

The invention relates to catalyst compositions useful in hydrocarbon upgrading processes and to methods for their production and use. In another aspect, this invention relates to processes for the desulfurization of gasoline range hydrocarbons employing the novel catalyst compositions of this invention.

BACKGROUND OF THE INVENTION

It is well known in the art to reduce the level of sulfur-containing hydrocarbons in gasoline by contacting the hydrocarbon feedstock with a hydrodesulfurization catalyst in the presence of hydrogen. The problem with most of the hydrodesulfurization catalysts and/or processes is the undesired saturation of high octane aromatic and olefinic compounds contained in the gasoline, which lowers the research octane number (RON) of the gasoline. The RON can be determined using ASTM Test Method D2699-97ae1. This lowering of the RON can require a costly further treatment of the desulfurized gasoline in order to restore the gasoline RON to, or close to, its original value. Thus, the development of catalysts and/or processes for desulfurization of gasoline which maintain the RON of the gasoline at or near its original value is desirable to the industry and would be a great benefit to the economy.

SUMMARY OF THE INVENTION

It is an object of the present invention to provide a novel catalyst composition effective for upgrading gasoline.

It is another object of the present invention to provide a novel catalyst composition effective for at least partially desulfurizing gasoline while maintaining the octane rating of the gasoline at or near the original value.

It is a further object of the present invention to provide an improved method of preparing a catalyst composition, effective for at least partially desulfurizing gasoline while maintaining the octane rating of the gasoline at or near the original value, which is economical and efficient.

It is a yet further object of the present invention to employ this novel catalyst composition in at least partially desulfurizing gasoline while maintaining the octane rating of the gasoline at or near the original value.

The inventive catalyst composition comprises a sulfided composition containing a zinc spinel, a zeolite, alumina, cobalt and molybdenum. The catalyst composition can be prepared by mixing together zeolite, zinc spinel and alumina to form a mixture; calcining the mixture to form a calcined mixture; impregnating molybdenum and cobalt into the calcined mixture to form an impregnated-calcined mixture; calcining the impregnated-calcined mixture to form a calcined-impregnated-calcined-mixture; and sulfiding the calcined-impregnated-calcined mixture.

The inventive catalyst composition can be used in upgrading gasoline by contacting, under conversion conditions, gasoline with the inventive catalyst composition.

Other objects and advantages of the invention will become apparent from the detailed description and the appended claims.

DETAILED DESCRIPTION OF THE INVENTION

The inventive catalyst composition comprises, consists of, or consists essentially of a sulfided composition comprising, consisting of, or consisting essentially of a zinc spinel, a zeolite, alumina, cobalt and molybdenum.

Any suitable alumina material can be used in preparing the inventive catalyst system. Suitable aluminas include (but are not limited to) hydrated aluminas (such as boehmite, pseudoboehmite, bayerite), alpha-alumina, beta-alumina, gamma-alumina, delta-alumina, eta-alumina and theta-alumina. The alumina material generally has a surface area (determined by the BET method of Brunauer, Emmett and Teller employing $N_2$, ASTM Test Method C1069-86 (1997) e1) of about 100 to about 400 $m^2/g$, a pore volume of about 0.2 to about 1.0 $cm^3/g$, and a particle size of about 8 to about 200 mesh.

The zeolite material used in preparing the inventive catalyst composition preferably has a constraint index (as defined in U.S. Pat. No. 4,097,367, the disclosure of which is incorporated herein by reference) in the range of from about 0.4 to about 12, preferably from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is in the range of from about 8:1 to about 200:1, more preferably in the range of from about 12:1 to about 100:1. Preferred zeolites include, but are not limited to, ZSM-5, ZSM-8, ZSM-11, ZSM-12, ZSM-35, ZSM-38, and mixtures of any two or more thereof. Some of these zeolites are also known as "MFI" or "Pentasil" zeolites. The presently more preferred zeolite is ZSM-5. The zeolite material used can be either acid leached or not acid leached.

Any suitable means or method can be used to treat the zeolite starting material with acid to give an acid-leached zeolite. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite particles. Preferably, the acid concentration in this solution is about 1–10 equivalents per liter. Examples of such suitable acids include sulfuric, phosphoric, nitric and hydrochloric. The preferred acid solution is aqueous hydrochloric acid. The zeolite is soaked in the acid solution (preferably at a temperature of about 50–100° C.) for a period upwardly to about 15 hours, but, preferably from 0.1 hour to 12 hours. After soaking, the resultant acid-leached zeolite is washed free of the acid and then can be dried or calcined, or both.

It is most preferred to use an H type zeolite, and most preferably HZSM-5, which can be prepared by ammonia/hydrogen ion exchange.

The zinc spinel suitable for use in the inventive catalyst composition can be a compound selected from the group consisting of zinc aluminate, zinc molybdate, zinc hexaborate, and combinations of any two or more thereof.

The preparation of the catalyst composition comprises, consists of, or consists essentially of the following steps.

The zeolite, zinc spinel and alumina can be physically mixed by any suitable means or method known in the art for mixing such materials thereby forming a mixture. The mixing is preferably accomplished in the presence of a liquid (such as a hydrocarbon solvent or water) which serves to form the zeolite, zinc spinel and alumina into a paste which is flowable and extrusile. The more preferred liquid is water, with the most preferred liquid being water acidified with an acid such as acetic acid, citric acid, hydrochloric acid, and the like.

The mixture can then be shaped by any suitable means or method such as by pelletizing, extruding or tableting. The presently preferred method is extrusion of the mixture into cylindrical extrudates.

The mixture, which can be extruded, is calcined prior to further treatment to form a calcined mixture.

The calcination is performed at a temperature generally in the range of from about 300° C. to about 1000° C., preferably from about 350° C. to about 750° C., and most preferably from 450° C. to 650° C. and a pressure generally in the range of from about 0.5 to about 50 atmospheres (atm), preferably from about 0.5 to about 30 atm, and most preferably from 0.5 to 10 atm. The calcination can be performed in an air atmosphere or a combination of an air atmosphere and an inert atmosphere for a time period in the range of from about 0.1 hour to about 30 hours, preferably from about 2 hours to about 20 hours, and most preferably from 3 hours to 15 hours.

The calcined mixture can be incorporated with cobalt and molybdenum by any suitable means or method known in the art for incorporating metallic elements into a substrate material. A preferred method is the use of any standard incipient wetness technique for impregnating the calcined mixture with cobalt and molybdenum. The preferred method uses a liquid impregnation solution containing the desirable concentrations of cobalt and molybdenum so as to ultimately provide the inventive catalyst composition having the required concentrations of cobalt and molybdenum.

It is particularly desirable to use for the impregnation of the calcined mixture an aqueous solution containing cobalt and molybdenum. The preferred impregnation solution is an aqueous solution formed by dissolving a cobalt compound and a molybdenum compound in water. It is preferable to use somewhat of an acidic solution to aid in the dissolution of the compounds. The acid used to acidify the impregnation solution is preferably citric acid.

Suitable molybdenum compounds include, but are not limited to, ammonium heptamolybdate, ammonium molybdate tetrahydrate, molybdenum (II) acetate dimer, molybdenum carbonyl, molybdenum (V) chloride, molybdenum (VI) dioxide bis(acetylacetonate) and 12-molybdophosphoric acid hydrate.

Suitable cobalt compounds include, but are not limited to, cobalt nitrate, cobalt (II) bromide hydrate, cobalt (II) chloride, cobalt (II) chloride hexahydrate, cobalt (II) hydroxide, cobalt (II) molybdate, cobalt (II) phosphate hydrate, cobalt (II) tungstate.

The impregnated-calcined mixture is calcined to form a calcined-impregnated-calcined mixture.

The calcination is performed at a temperature generally in the range of from about 300° C. to about 1000° C., preferably from about 350° C. to about 750° C., and most preferably from 450° C. to 650° C. and a pressure generally in the range of from about 0.5 to about 50 atmospheres (atm), preferably from about 0.5 to about 30 atm, and most preferably from 0.5 to 10 atm. The calcination can be performed in an air atmosphere or a combination of an air atmosphere and an inert atmosphere for a time period in the range of from about 0.1 hour to about 30 hours, preferably from about 2 hours to about 20 hours, and most preferably from 3 hours to 15 hours.

The calcined-impregnated-calcined mixture is sulfided to form the inventive catalyst composition. The sulfiding is conducted at a temperature generally in the range of from about 200° C. to about 600° C., preferably from about 250° C. to about 550° C., and most preferably from 300° C. to 500° C., and for a time period generally in the range of from about 0.1 hour to about 10 hours, preferably from about 0.5 hour to about 8 hours, and most preferably from 1 hour to 5 hours, and in the presence of carbon disulfide, and optionally, hydrogen.

In a preferred embodiment, the calcined mixture, described above, can be exposed to a steam treatment prior to impregnating the calcined mixture with cobalt and molybdenum. The steam treatment is believed to enhance the $C_5$+wt. % yield of a gasoline stream contacted therewith. The steam treatment is conducted at a temperature generally in the range of from about 500° C. to about 800° C., preferably from about 550° C. to about 750° C., and most preferably from 600° C. to 700° C., for a time period in the range of from about 0.1 hour to about 30 hours, preferably from about 2 hours to about 20 hours, and most preferably from 3 hours to 15 hours, and in the presence of water.

The weight percent of elemental cobalt present in the catalyst composition is generally in the range of from about 0.5 wt. % to about 50 wt. %, preferably from about 1 wt. % to about 20 wt. %, and most preferably from 1 wt. % to 10 wt. %, based on the total weight of the catalyst composition.

The weight percent of elemental molybdenum present in the catalyst composition is generally in the range of from about 1 wt. % to about 50 wt. %, preferably from about 2 wt. % to about 40 wt. %, and most preferably from 3 wt. % to 20 wt. %, based on the total weight of said catalyst composition.

The weight percent of elemental zinc present in the catalyst composition is generally in the range of from about 1 wt. % to about 50 wt. %, preferably from about 2 wt. % to about 40 wt. %, and most preferably from 3 wt. % to 20 wt. %, based on the total weight of said catalyst composition.

All weight percents of components of the inventive catalyst composition can be measured using x-ray fluorescence analysis, as described in "Spectrometry: Principles and Practices in X-Ray Spectrometric Analysis" by Eugene Burton, 2nd edition.

The inventive catalyst composition is generally employed in the upgrading of a hydrocarbon feedstock such as gasoline. The hydrocarbon feedstock is upgraded by removing sulfur-containing hydrocarbons but maintaining the octane rating of the hydrocarbon feedstock at or near its original value.

Suitable hydrocarbon feedstocks include, but are not limited to, gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred feed is a gasoline-boiling range hydrocarbon feedstock suitable for use as at least a gasoline blend stock generally having a boiling range of about 30–210° C. Generally, the content of paraffins exceeds the combined content of olefins, naphthenes and aromatics (if present).

The hydrocarbon feedstock further comprises at least about 20 ppmw sulfur. More typically, the concentration of sulfur will be in the range of from about 100 ppmw to about 3000 ppmw, and most typically the sulfur content will be in the range of from 200 ppmw to 1000 ppmw. Sulfur ppmw, as used herein, means the parts per million by weight of atomic sulfur contained in a hydrocarbon stream.

The hydrocarbon feedstock can be contacted in any suitable manner with the inventive catalyst composition described herein contained within a reaction zone and in the presence of hydrogen. The contacting step can be operated as a batch process step or, preferably, as a continuous process step. In the latter operation, a solid catalyst bed or a moving catalyst bed or a fluidized catalyst bed can be employed. Any of these operational modes has advantages and disadvantages, and those skilled in the art can select the one most suitable for a particular feed and catalyst.

The contacting step is preferably carried out within a reaction zone, wherein is contained the inventive catalyst composition, and under desulfurization conditions, including the presence of hydrogen, effective for reducing the sulfur content of sulfur-containing hydrocarbons. The reaction temperature of the contacting step is generally in the range of from about 250° C. to about 800° C., preferably from about 275° C. to about 700° C., and most preferably from 300° C. to 600° C. The contacting pressure can range from subatmospheric pressure upwardly to about 1000 psia, preferably, from about atmospheric to about 800 psia, and most preferably from 20 psia to 700 psia.

The flow rate at which the hydrocarbon feedstock is charged to the reaction zone is such as to provide a weight hourly space velocity ("WHSV") in the range of from about 0.01 hour$^{-1}$ to about 1000 hour$^{-1}$. The term "weight hourly space velocity", as used herein, shall mean the numerical ratio of the rate at which a hydrocarbon feedstock is charged to the conversion reaction zone in pounds per hour divided by the pounds of catalyst contained in the reaction zone to which the hydrocarbon feedstock is charged. The preferred WHSV of the feed to the conversion reaction zone can be in the range of from about 0.25 hour$^{-1}$ to about 250 hour$^{-1}$ and, most preferably, from 0.5 hour$^{-1}$ to 100 hour$^{-1}$.

The following examples are presented to further illustrate this invention and are not to be construed as unduly limiting its scope.

EXAMPLE I

This example illustrates the preparation of catalysts which were subsequently tested as catalysts in the hydrodesulfurization of a hydrocarbon feedstock.

Catalyst A (control)

A 30.3 gram quantity of a commercially available CoMo/Al$_2$O$_3$ catalyst (provided by Haldor-Topsoe, Inc., Houston, Tex. under product designation Tk-750) was calcined at 538° C. for 1 hour followed by sulfiding at 400° C. for 2 hours in the presence of hydrogen and carbon disulfide.

Catalyst B (control)

A commercially available alumina (provided by Vista Chemical Company, Houston, Tex., under product designation Catapal® D alumina) was combined with a commercially available HZSM-5 zeolite (provided by Uetikon Corp., Switzerland under product designation Zeocat® zeolite) to form an alumina bound HZSM-5 material. A 10 gram quantity of this material was impregnated by incipient wetness with 15 grams of an aqueous solution containing 10 wt. % ammonium heptamolybdate, 8 wt. % cobalt nitrate and 10 wt. % citric acid. The impregnated material was then calcined at 538° C. for 6 hours followed by sulfiding at 400° C. for 2 hours in the presence of hydrogen and carbon disulfide.

Catalyst C (inventive)

A 10 gram quantity of Zeocat® HZSM-5 zeolite was combined with 2 grams of zinc hexaborate, 12 grams of Catapal® D alumina and sufficient acidified water to form an extrusile paste. The extrusile paste was extruded and then calcined at 538° C. for 6 hours. A 19.3 gram quantity of the calcined material was impregnated by incipient wetness with 15 grams of an aqueous solution containing 10 wt. % ammonium heptamolybdate, 8 wt. % cobalt nitrate and 20 wt. % citric acid. The impregnated material was then calcined at 538° C. for 6 hours followed by sulfiding at 400° C. for 2 hours in the presence of hydrogen and carbon disulfide.

Catalyst D (inventive)

A 10 gram quantity of Zeocat® HZSM-5 zeolite was combined with 2 grams of zinc aluminate, 12 grams of Catapal® D alumina and sufficient acidified water to form an extrusile paste. The extrusile paste was extruded and then calcined at 538° C. for 6 hours. An 8.1 gram quantity of the calcined material was impregnated by incipient wetness with 6.9 grams of an aqueous solution containing 20 wt. % ammonium heptamolybdate, 16 wt. % cobalt nitrate and citric acid. The impregnated material was calcined at 538° C. for 6 hours followed by sulfiding at 380° C. for 2 hours in the presence of hydrogen and carbon disulfide.

Catalyst E (control)

A 10 gram quantity of Zeocat® HZSM-5 zeolite was combined with 2 grams of zinc molybdate, 12 grams of Catapal® D alumina and sufficient acidified water to form an extrusile paste. The extrusile paste was extruded and then calcined at 538° C. for 6 hours.

Catalyst F (inventive)

A 10 gram quantity of Catalyst E was impregnated by incipient wetness with 15 grams of an aqueous solution containing 10 wt. % ammonium heptamolybdate, 8 wt. % cobalt nitrate and 20 wt. % citric acid. The impregnated material was then calcined at 538° C. for 6 hours followed by sulfiding at 400° C. for 2 hours in the presence of hydrogen and carbon disulfide.

Catalyst G (inventive)

A 9.7 gram quantity of Catalyst E was steamed at 650° C. for 6 hours. The steamed material was impregnated by incipient wetness with 15 grams of an aqueous solution containing 10 wt. % ammonium heptamolybdate, 8 wt. % cobalt nitrate and 20 wt. % citric acid. The impregnated material was then calcined at 538° C. for 6 hours followed by sulfiding at 400° C. for 2 hours in the presence of hydrogen and carbon disulfide.

EXAMPLE II

This example illustrates the use of the catalysts from Example I in the hydrodesulfurization of a catalytically cracked gasoline (CCG) feed. For each of the following runs, a 5 mL. quantity of catalyst was placed in a stainless steel tube reactor (length: about 18 inches; diameter: about 0.5 inch) and the CCG feed to the reactor was 20 mL/hr., unless otherwise stated. The CCG feed contained 298 ppmw sulfur and had a calculated RON of 89.2. Calculation of octane numbers in this example were performed based on the measured octane numbers of the pure components of the streams. A hydrogen flow was also passed through the reactor at a flow rate of 15.6 L/hr.

Run 1 (control)

Catalyst A was used in this run. The reactor temperature was 346° C., the pressure was 508 psig and the H$_2$/CCG feed mole ratio was 3.8. Test results obtained after 6.1 hours on stream are summarized in the Table.

Run 2 (control)

Catalyst B was used in this run. The reactor temperature was 353° C., the pressure was 496 psig and the H$_2$/CCG feed mole ratio was 3.8. Test results obtained after 7.1 hours on stream are summarized in the Table.

Run 3 (inventive)

Inventive Catalyst C was used in this run. The reactor temperature was 349° C., the pressure was 526 psig and the H$_2$/CCG feed mole ratio was 3.8. Test results obtained after 6.1 hours on stream are summarized in the Table.

Run 4 (inventive)

Inventive Catalyst D was used in this run. The reactor temperature was 356° C., the pressure was 505 psig and the H$_2$/CCG feed mole ratio was 3.8. Test results obtained after 7.6 hours on stream are summarized in the Table.

Run 5 (control)

Catalyst E was used in this run. The reactor temperature was 350° C., the pressure was 500 psig and the H$_2$/CCG feed mole ratio was 3.8. Test results obtained after 6.6 hours on stream are summarized in the Table.

Run 6 (inventive)

Inventive Catalyst F was used in this run. The reactor temperature was 347° C., the pressure was 514 psig and the H$_2$/CCG feed mole ratio was 3.8. Test results obtained after 6.0 hours on stream are summarized in the Table.

Run 7 (inventive)

Inventive Catalyst G was used in this run. The reactor temperature was 350° C., the pressure was 500 psig and the H$_2$/CCG feed mole ratio was 3.8. Test results obtained after 6.8 hours on stream are summarized in the Table.

TABLE

| Run | Catalyst | ΣC$_5$+[1] wt. % yield | Calculated[2] RON | Sulfur ppmw | HDS wt %[3] |
|---|---|---|---|---|---|
| 1 | A(control) [S]CoMo/Al$_2$O$_3$ | 80.60 | 83.30 | 6 | 97.99 |
| 2 | B(control) [S]CoMo/HZSM-5/Al$_2$O$_3$ | 45.10 | 96.36 | 19 | 93.62 |
| 3 | C(inventive) [S]CoMo/HZSM-5/Zn$_2$B$_6$O$_{11}$/Al$_2$O$_3$ | 69.36 | 89.17 | 18 | 93.96 |
| 4 | D(inventive) [S]CoMo/HZSM-5/ZnAl$_2$O$_4$/Al$_2$O$_3$ | 60.00 | 88.44 | 18 | 93.96 |
| 5 | E(control) HZSM-5/ZnMoO$_4$/Al$_2$O$_3$ | 54.09 | —[4] | 250 | 16.11 |
| 6 | F(inventive) [S]CoMo/HZSM-5/ZnMoO$_4$/Al$_2$O$_3$ | 55.33 | 91.97 | 26 | 91.28 |
| 7 | G(inventive) [S]CoMo[steamed] HZSM-5/ZnMoO$_4$/Al$_2$O$_3$ | 75.02 | 89.19 | 25 | 91.61 |

[1]Represents the wt. % C$_5$+ hydrocarbons present in the product, based on the total weight of the product.
[2]Calculated based on the RON values and relative percentages of the individual components in the product. RON can be determined using ASTM Test Method D2699-97ae1.
[3]Represents the wt. % reduction of elemental sulfur in the product compared to the CCG feed.
[4]Not calculated due to the high sulfur content.

The test data presented in the Table show that use of inventive Catalysts C, D, F and G in Runs 3, 4, 6 and 7, respectively, resulted in a better combination of C$_5$+wt. % yield, calculated RON and HDS wt. % as compared to control Catalysts A, B, and E used in Runs 1,2 and 5, respectively.

The C$_5$+wt. % yield and HDS wt. %, for control Run 1 using control Catalyst A, were high but the calculated RON was significantly lower than the calculated RON of the CCG feed (6.6% lower). The calculated RON for control Run 2 using control Catalyst B was high (8.0% higher than the calculated RON of the CCG feed) but the C$_5$+wt. % yield and the HDS wt. % were low.

The calculated RON and the HDS wt. % were also low for control Run 5 using control Catalyst E.

Inventive Run 3, using inventive Catalyst C, demonstrated a 53.8% higher C$_5$+wt. % yield over control Run 2 and a 7.0% increase in calculated RON over control Run 1. Inventive Run 4, using inventive Catalyst D, demonstrated a 33.0% higher C$_5$+wt. % yield over control Run 2 and a 6.2% increase in calculated RON over control Run 1.

Inventive Run 6, using inventive Catalyst F, demonstrated a 22.7% and a 2.3% higher C$_5$+wt. % yield over control Runs 2 and 5, respectively, and a 10.4% increase in calculated RON over control Run 1.

Inventive Run 7, using inventive Catalyst G (which had been steamed), demonstrated a 35.6% higher C$_5$+wt. % yield and only a 3.0% decrease in calculated RON as compared to inventive Run 6.

Each of the inventive Runs demonstrated in excess of 91 wt. % HDS, calculated RON values of between only 0.9% lower and 3.1% higher than the calculated RON of the CCG feed, and C$_5$+wt. % yields ranging from 55.33 wt. % to 75.02 wt. %.

From the data in the Table, it is readily apparent that the inventive catalyst compositions C, D, F and G effectively hydrodesulfurize gasoline while substantially maintaining the octane rating and providing for reasonable C$_5$+wt. % yields.

Reasonable variations, modifications, and adaptations can be made within the scope of the disclosure and the appended claims without departing from the scope of this invention.

That which is claimed is:

1. A catalyst composition comprising a sulfided composition comprising a zinc spinel, a zeolite, alumina, cobalt and molybdenum.

2. A catalyst composition consisting essentially of a sulfided composition consisting essentially of a zinc spinel, a zeolite, alumina, cobalt and molybdenum.

3. A catalyst composition consisting of a sulfided composition consisting of a zinc spinel, a zeolite, alumina, cobalt and molybdenum.

4. A catalyst composition in accordance with claim 1 wherein said zinc spinel is selected from the group consisting of zinc molybdate, zinc aluminate, zinc hexaborate, and combinations of any two or more thereof.

5. A catalyst composition in accordance with claim 1 wherein said zeolite is ZSM-5.

6. A catalyst composition in accordance with claim 1 wherein cobalt is present in an amount in the range of from about 0.5 wt. % to about 50 wt. %, based on the total weight of said catalyst composition.

7. A catalyst composition in accordance with claim 1 wherein molybdenum is present in an amount in the range of from about 1 wt. % to about 50 wt. %, based on the total weight of said catalyst composition.

8. A catalyst composition in accordance with claim 1 wherein elemental zinc is present in an amount in the range of from about 1 wt. % to about 50 wt. %, based on the total weight of said catalyst composition.

9. A method of preparing a catalyst composition comprising the steps of:
   mixing together zeolite, zinc spinel and alumina to form a mixture;
   calcining said mixture in the presence of air to form a calcined mixture;
   impregnating molybdenum and cobalt into said calcined mixture thereby forming an impregnated calcined mixture;
   calcining said impregnated calcined mixture in the presence of air thereby forming a calcined impregnated calcined mixture; and
   sulfiding said calcined impregnated calcined mixture.

10. A method in accordance with claim 9 wherein the calcining of said mixture and the calcining of said impregnated calcined mixture are each conducted at a temperature in the range of from about 300° C. to about 100° C. and for a time period of from about 0.1 hour to about 30 hours.

11. A method in accordance with claim 9 wherein said impregnating molybdenum and cobalt into said calcined mixture comprises contacting said calcined mixture with a solution comprising a molybdenum compound and a cobalt compound.

12. A method in accordance with claim 11 wherein said molybdenum compound is selected from the group consisting of ammonium heptamolybdate, ammonium molybdate tetrahydrate, molybdenum (II) acetate dimer, molybdenum carbonyl, molybdenum (V) chloride, molybdenum (VI) dioxide bis(acetylacetonate),12-molybdophosphoric acid hydrate, and combinations of any two or more thereof, and wherein said cobalt compound is selected from the group consisting of cobalt nitrate, cobalt (II) bromide hydrate, cobalt (II) chloride, cobalt (II) chloride hexahydrate, cobalt (II) hydroxide, cobalt (II) molybdate, cobalt (II) phosphate hydrate, cobalt (II) tungstate, and combinations of any two or more thereof.

13. A method in accordance with claim 9 wherein said sulfiding of said calcined impregnated calcined mixture is conducted at a temperature in the range of from about 200° C. to about 600° C., for a time period in the range of from about 0.1 hour to about 10 hours, and in the presence of carbon disulfide.

14. A method in accordance with claim 9 wherein said zinc spinel is selected from the group consisting of zinc molybdate, zinc aluminate, zinc hexaborate, and combinations of any two or more thereof.

15. A method in accordance with claim 9 wherein said zinc spinel is zinc molybdate.

16. A method in accordance with claim 9 wherein said zinc spinel is zinc aluminate.

17. A method in accordance with claim 9 wherein said zinc spinel is zinc hexaborate.

18. A method in accordance with claim 9 wherein said calcined mixture is steamed, at a temperature in the range of from about 500° C. to about 800° C. and for a time period in the range of from about 0.1 hour to about 30 hours, prior to said step of impregnating.

19. A process for upgrading a hydrocarbon feedstock comprising gasoline comprising contacting said hydrocarbon feedstock, under conversion conditions, with the catalyst composition of claim 1.

20. A process in accordance with claim 19 wherein said hydrocarbon feedstock is characterized further to include sulfur-containing hydrocarbons.

21. A process in accordance with claim 19 wherein said conversion conditions include a temperature in the range of from about 200° C. to about 500° C. and the presence of hydrogen.

22. A process for upgrading a hydrocarbon feedstock comprising gasoline comprising contacting said hydrocarbon feedstock, under conversion conditions, with the catalyst composition of claim 4.

23. A process in accordance with claim 22 wherein said hydrocarbon feedstock is characterized further to include sulfur-containing hydrocarbons.

24. A process in accordance with claim 22 wherein said conversion conditions include a temperature in the range of from about 200° C. to about 500° C. and the presence of hydrogen.

25. A process for upgrading a hydrocarbon feedstock comprising gasoline comprising contacting said hydrocarbon feedstock, under conversion conditions, with a catalyst composition prepared by the method of claim 9.

26. A process in accordance with claim 25 wherein said hydrocarbon feedstock is characterized further to include sulfur-containing hydrocarbons.

27. A process in accordance with claim 25 wherein said conversion conditions include a temperature in the range of from about 200° C. to about 500° C. and the presence of hydrogen.

28. A process for upgrading a hydrocarbon feedstock comprising gasoline comprising contacting said hydrocarbon feedstock, under conversion conditions, with a catalyst composition prepared by the method of claim 12.

29. A process in accordance with claim 28 wherein said hydrocarbon feedstock is characterized further to include sulfur-containing hydrocarbons.

30. A process in accordance with claim 28 wherein said conversion conditions include a temperature in the range of from about 200° C. to about 500° C. and the presence of hydrogen.

31. A process for upgrading a hydrocarbon feedstock comprising gasoline comprising contacting said hydrocarbon feedstock, under conversion conditions, with a catalyst composition prepared by the method of claim 18.

32. A process in accordance with claim 31 wherein said hydrocarbon feedstock is characterized further to include sulfur-containing hydrocarbons.

33. A process in accordance with claim 31 wherein said conversion conditions include a temperature in the range of from about 200° C. to about 500° C. and the presence of hydrogen.

* * * * *

UNITED STATES PATENT AND TRADEMARK OFFICE
CERTIFICATE OF CORRECTION

PATENT NO.   : 6162352
DATED        : December 19, 2000
INVENTOR(S)  : An-hsiang Wu, Charles A. Drake and Ralph J. Melton It is certified that error appears in the above-identified patent and that said Letters Patent is hereby corrected as shown below:

Claim 10, Column 8, line 64 please delete "100°C" and insert therefor --- 1000°C ---.

Signed and Sealed this

Twenty-ninth Day of May, 2001

Attest:

NICHOLAS P. GODICI

Attesting Officer    Acting Director of the United States Patent and Trademark Office